United States Patent
Kalos et al.

(10) Patent No.: US 7,694,038 B2
(45) Date of Patent: Apr. 6, 2010

(54) MAINTAINING AND USING NEXUS INFORMATION ON A HOST, PORT AND DEVICE CONNECTION

(75) Inventors: Matthew Joseph Kalos, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1050 days.

(21) Appl. No.: 10/991,662

(22) Filed: Nov. 17, 2004

(65) Prior Publication Data

US 2006/0106808 A1 May 18, 2006

(51) Int. Cl.
*G06F 13/00* (2006.01)
(52) U.S. Cl. .................. 710/33; 710/38; 710/62; 710/316
(58) Field of Classification Search .......... 710/2, 710/14, 19, 29, 30, 38, 43, 63, 316, 33, 62
See application file for complete search history.

(56) References Cited

U.S. PATENT DOCUMENTS

| | | | |
|---|---|---|---|
| 6,115,772 A * | 9/2000 | Crater ................. 710/306 |
| 6,633,962 B1 * | 10/2003 | Burton et al. .......... 711/163 |
| 6,865,741 B1 * | 3/2005 | Fagen et al. ........... 719/313 |
| 7,047,390 B2 * | 5/2006 | Factor et al. .......... 711/202 |
| 7,069,354 B2 | 6/2006 | Pooni et al. |
| 7,257,663 B2 | 8/2007 | Kalos et al. |
| 7,315,903 B1 * | 1/2008 | Bowden ............... 709/250 |
| 2004/0034750 A1 * | 2/2004 | Horn ................... 711/156 |
| 2004/0064461 A1 | 4/2004 | Pooni et al. |
| 2005/0273651 A1 * | 12/2005 | Subbarao ............... 714/6 |

* cited by examiner

*Primary Examiner*—Tariq Hafiz
*Assistant Examiner*—Jasjit S Vidwan
(74) *Attorney, Agent, or Firm*—David W. Victor; Konrad Raynes & Victor LLP

(57) ABSTRACT

Provided are a method, system, and program maintaining and using nexus information on a host, port and device connection. A login is received from a host port on a storage controller port, wherein the host port has been configured on the storage controller to access one or more devices. An entry is added to a host-storage controller ports data structure for the host port and storage controller port involved in the login. At least one pointer is initialized in the entry in the host-storage controller ports data structure to point to at least one entry in at least one intermediate data structure. One pointer is initialized in each entry in one intermediate data structure addressed by one initialized pointer in the host-storage controller ports data structure to point to a nexi data structure having a plurality of entries.

41 Claims, 5 Drawing Sheets

MAINTAINING AND USING NEXUS INFORMATION ON A HOST, PORT AND DEVICE CONNECTION

BACKGROUND OF THE INVENTION

1. Field of the Invention

The present invention relates to a method, system, and program for maintaining and using nexus information on a host, port and device connection

2. Description of the Related Art

In certain computing environments, multiple host systems may communicate with one or more storage controllers, such as an IBM Enterprise Storage Server (ESS)®, for data in a storage device managed by the ESS receiving the request. The storage controller manages access to storage devices, such as interconnected hard disk drives through one or more logical paths. (IBM and ESS are registered trademarks of IBM). The interconnected drives may be configured as a Direct Access Storage Device (DASD), Redundant Array of Independent Disks (RAID), Just a Bunch of Disks (JBOD), etc. The storage controller may configure logical volumes that define regions of storage space in the storage devices the storage controller manages.

The storage controller or an adaptor in the storage controller may maintain nexus information on each possible connection comprising a host port, storage controller port, and storage device (logical volume). In the Small Computer System Interface (SCSI), an initiator (I) interacts with a target(T) to issue I/O operations to a logical unit (L). While the I/O operation is in progress, the initiator/target/logical unit have a relationship referred to as an ITL nexus. In order to manage an ITL nexus, a storage controller may need to maintain certain information that persists beyond the duration of the I/O operation. For instance, this information may consist of indicators related to pending unit attention conditions and reservations. In a typical implementation, the initiator function is associated with a host port, the target function is associated with a storage controller port, and the logical unit is associated with a storage device. This information is maintained even for host port-storage controller port-logical volume combinations that do not currently have configured logical volumes since they may be added to the configuration at a later time. The memory needed to store the nexus information increases as the number of devices, storage controller ports, and attached host-ports in the configuration increases.

SUMMARY

Provided are a method, system, and program maintaining and using nexus information on a host, port and device connection. A login is received from a host port on a storage controller port, wherein the host port has been configured on the storage controller to access one or more devices. An entry is added to a host-storage controller ports data structure for the host port and storage controller port involved in the login. At least one pointer is initialized in the entry in the host-storage controller ports data structure to point to at least one entry in at least one intermediate data structure. One pointer is initialized in each entry in one intermediate data structure addressed by one initialized pointer in the host-storage controller ports data structure to point to a nexi data structure having a plurality of entries

DETAILED DESCRIPTION

Figure 1:
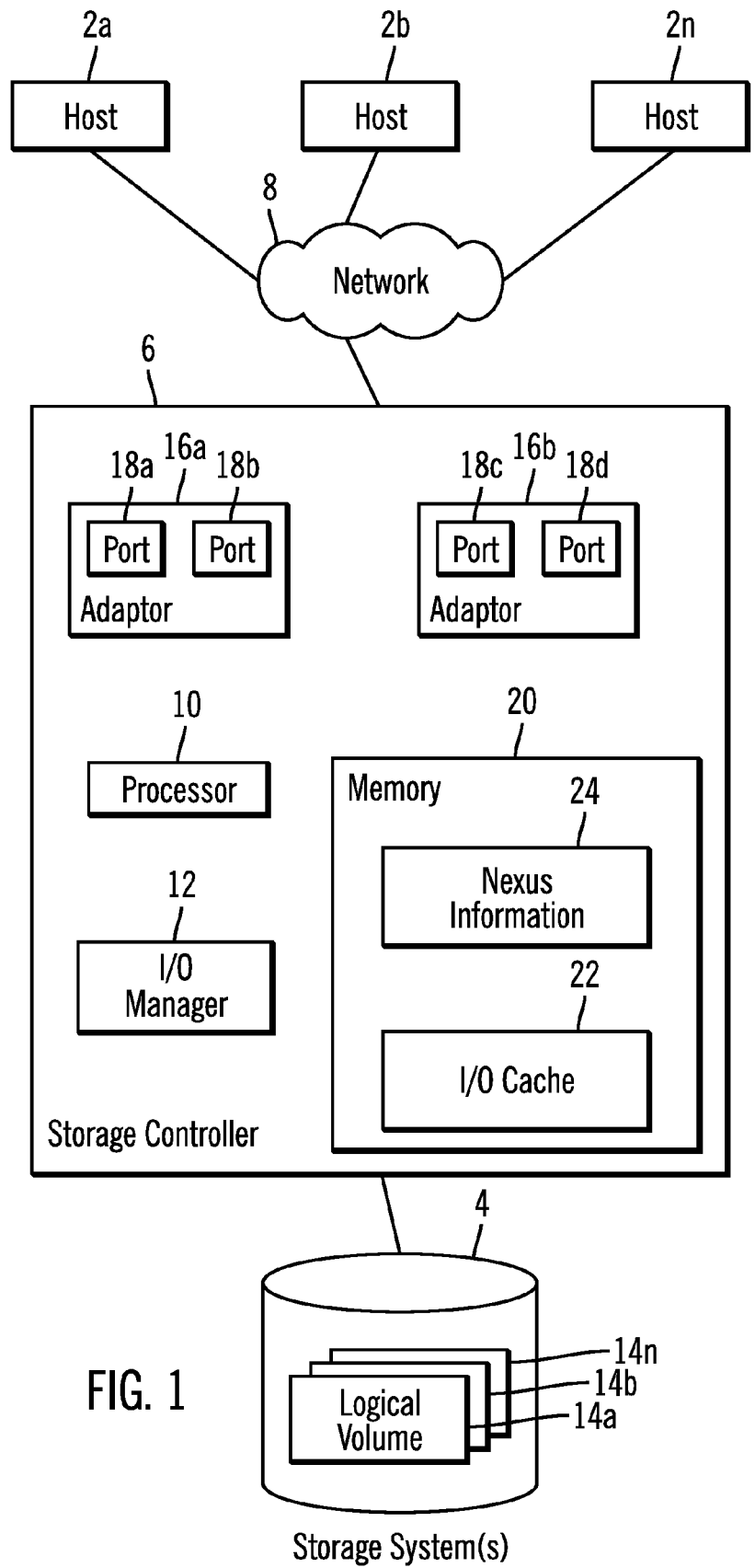
FIG. 1 illustrates an embodiment of a computing environment.

FIG. 1 illustrates an embodiment of a computing environment. Multiple hosts $2a$, $2b$ . . . $2n$ communicate Input/Output (I/O) requests directed to one or more storage systems 4 (only one is shown) to a storage controller 6 over a network 8, where the storage controller 6 manages access to the storage system(s) 4. Each host $2a$, $2b$ . . . $2n$ may include one or more host ports on host adaptor cards. The storage controller 6 includes a processor 10 that executes I/O manager code 12 to configure and manage logical volumes $14a$, $14b$ . . . $14n$ in the storage system(s) 4. A volume comprises a logical representation of a section of the storage space in the storage systems 4 that may be referenced by the hosts $2a$, $2b$ . . . $2n$, such as a logical device or logical unit number (LUN). The storage controller 6 includes a plurality of adaptors $16a$, $16b$, including ports $18a$, $18b$, $18c$, and $18d$. There may be more or fewer adaptors and ports and more or fewer ports per adaptor than shown in FIG. 1. Each host $2a$, $2b$ . . . $2n$ may connect to each of the ports $18a$, $18b$ . . . $18n$ to connect to the logical volumes $14a$, $14b$ . . . $14n$.

The storage controller 6 includes a memory 20, such as a non-volatile memory including an I/O cache 22 and nexus information 24 providing information on an established connection between a host, port and logical volume, also known as nexus information. The nexus information may provide information on indicators for the connection, such as unsolicited unit attention conditions, reservation status, events to report, status, etc. Although it is possible that any host $2a$, $2b$ . . . $2n$ may connect through any port $18a$, $18b$, $18c$, $18d$ to connect to any logical volume $14a$, $14b$ . . . $14n$, in many implementations hosts may connect to fewer than all possible logical volumes through all possible ports. The I/O manager code 12 is capable of using the nexus information 22 to process requests on different connections.

The hosts $2a$, $2b$ . . . $2n$ may comprise computing systems capable of communicating I/O requests over a network, such as a server, workstation, desktop, mainframe, laptop, hand held computing device, telephony device, etc. The storage controller 6 may comprise a storage server, enterprise storage server, storage controller or other device used to manage I/O requests directed to storage systems 4 managed by the storage controller. In one embodiment, the described operations to manage volumes are performed on Fibre Channel interconnections using the SCSI upper layer protocol (ULP). The storage system(s) 4 may include one or more storage devices known in the art, such as interconnected hard disk drives (e.g., configured as a DASD, RAID, JBOD, etc.), magnetic tape drive, electronic memory, etc. The network 8 may comprise a local area network (LAN), storage area network (SAN), the Internet, and Intranet, a wireless network, bus interface, serial or parallel connection, etc.

Figure 2:
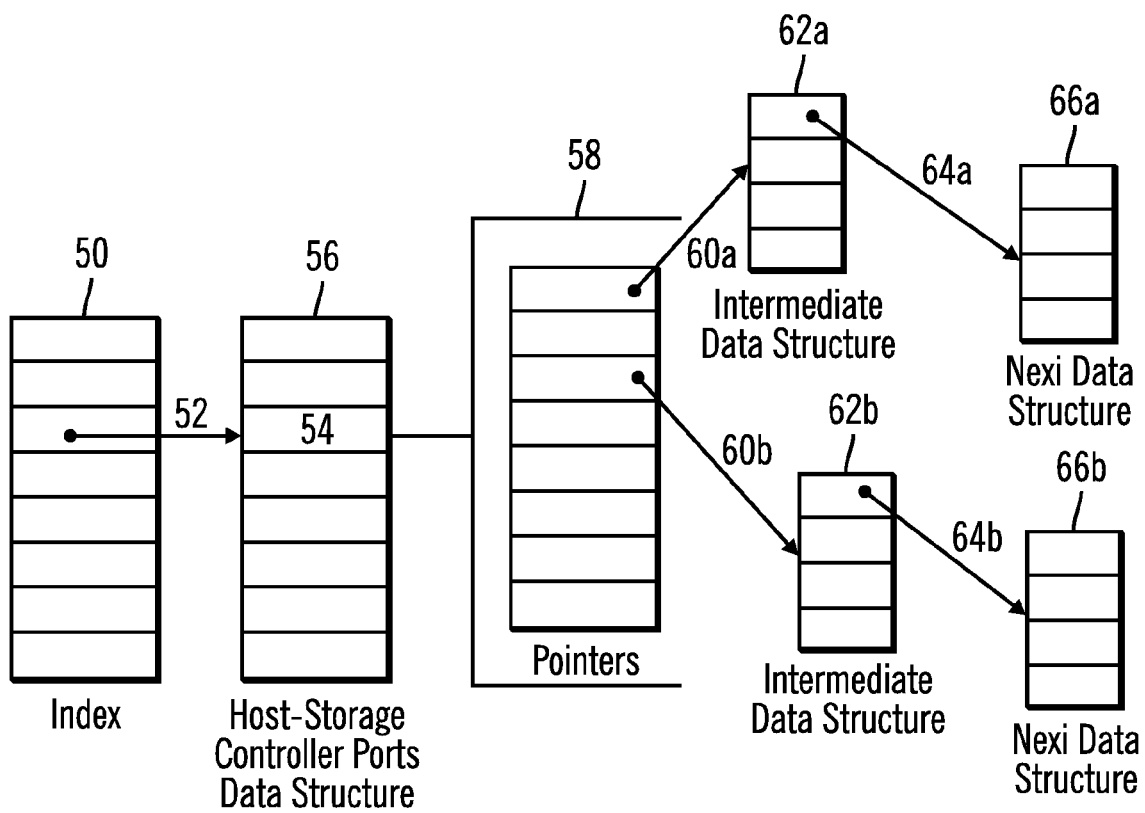
FIG. 2 illustrates data structures used to maintain nexus information on host-storage controller port-logical volume connections.

FIG. 2 illustrates an arrangement of data structures used to maintain the nexus information for different host port-storage controller port-device connections. An index 50 has entries indexed by the identifiers for a host port $2a$, $2b$ . . . $2n$ and storage controller port $18a$, $18b$, $18c$, $18d$, where each indexed entry includes a pointer, e.g., 52, to an entry, e.g., 54, in a host port-storage controller port data structure 56. In one embodiment, an index table 50 is maintained for each I/O port in the I/O adapter. Each I/O port supports some number of N-Port Logins from attached hosts, which may comprise a Fibre Channel or other protocol login. Each N-port login uses one element of the host-port index table 50 and the contents of the entry identifies the host port that logged in and also a unique index of an entry in the host port-storage controller ports data structure that is obtained from the storage controller for this particular N-port login on this I/O port at the point the host port issues a process login. Thus, when adding a new process login for a new host port-storage controller port combination, an entry/pointer, e.g., 52, is added to the index 50 addressing a new entry, e.g., 54, added to the host port-storage controller port data structure 56 for that host port-storage controller-port combination. The number of entries in the host port-storage controller port data structure determines the number of process logins that are possible on all storage controller ports. Each entry, e.g., 54, in the host port-storage controller port data structure 56 includes a plurality of pointers 58, where each pointer, e.g., 60a, 60b, addresses a separate intermediate data structure, e.g., 62a, 62b. Each intermediate data structure 62a, 62b includes pointers, e.g., 64a, 64b, where each pointer, e.g., 64a, 64b, addresses a different nexi data structure 66a, 66b. The entries of the nexi data structures 66a, 66b provide nexus information for LUNs that are associated with consecutively addressed logical volumes 14a, 14b . . . 14n where the logical volume addresses are unique and assigned according to some scheme utilized by the storage controller. There exists a defined mapping from a LUN_ID used by the host port on the I/O interface to a logical volume address.

A device (logical volume) address may be used to index into the different data structures to locate the nexus information entry in the nexi data structure 66a, 66b. For instance, a first portion of the device address may identify a first pointer 60a, 60b comprising any one of the pointers 58 included in the entry 54 in the host port-storage controller port data structure 56 for the host-port pair. A second portion of the device address may identify a second pointer 64a, 64b in the intermediate data structure 62a, 62b addressed by the first pointer, e.g., 60a, 60b. The first and second pointers may comprise any of the pointes in the groups 58 and 60a, 60b of pointers. A third part of the device address may then provide an index to the entry in the nexi data structure 66a, 66b containing the nexus information for the host-port-device combination addressed by the pointer 64a, 64b in the intermediate data structure 62a, 62b. 62b.

In one embodiment, the nexus information in the nexi data structure 66 provides nexus information for devices accessed via the same host port-storage controller port-pair (i.e., process login), where the devices in the same nexi data structure 66a, 66b may have consecutive logical volume addresses. In certain embodiments where host port-storage controller port pair (i.e., process login) is configured to access only a subset of the possible logical volumes, a nexi data structure, e.g., 66a, 66b, which would have no nexus information (because the logical volumes associated this nexi data structure are not accessible or not configured) is not allocated and the pointers, e.g., 64a, 64b, in the next higher intermediate data structure, e.g., 62a, 62b, contain a null pointer (i.e. does not point to a nexi data structure). Similarly, any intermediate data structure, e.g., 62a, 62b, that would contain all null pointers, e.g., 64a, 64b, is not allocated and the associated pointer in the host port data structure contains a null pointer. Changes to the set of logical volumes that a given process login is configured to access may result in the need to add or remove nexi data structures, e.g., 66a, 66b, for the process login with a corresponding change to the host port-storage controller port data structure 56 and intermediate data structure pointers, e.g., 64a, 64b.

In one embodiment, the set of nexi data structures and intermediate data structures are held as a shared resource which are dynamically allocated to a given host-port data structure at the point a process login is accepted, based on the logical volume addresses the host-port connection may access. These resources are also dynamically allocated or deallocated if the set of logical volume addresses the host and port may has access are changed or if the process login for the host and port is removed. The process login may comprise a SCSI process login and the N-port login may comprise a Fibre Channel N-port login. Other protocols and login types may be used in different embodiments.

Figure 3:
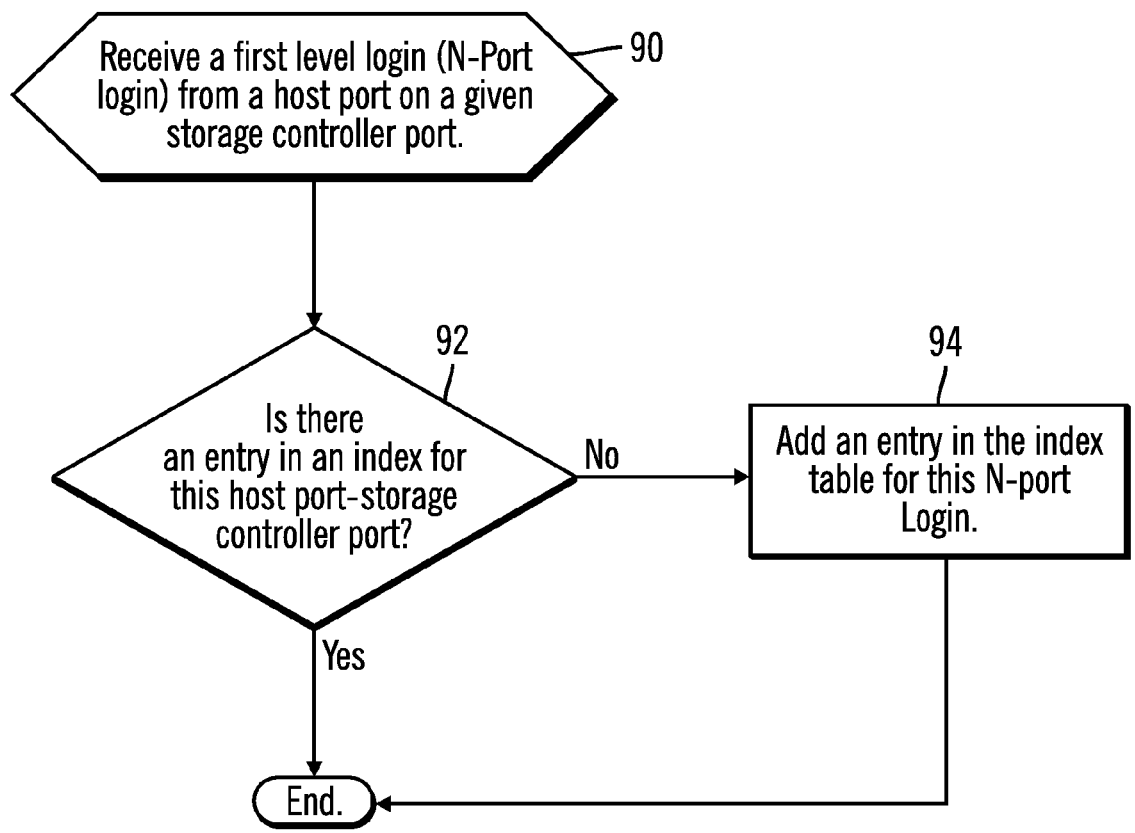
FIGS. 3, 4, and 5 illustrate operations to generate and use the nexus information.

FIG. 3 illustrates operations implemented in the I/O manager 12 to initialize the index 50 with information on first level login for a host port and storage controller ports, where a first level login may comprise a network login, such as a Fibre Channel N-port login. Upon receiving (at block 90) a first level login (e.g., N-Port login) from a host port 2a, 2b, 2n on a given storage controller port 18a, 18b, 18c, 18d, if (at block 92) there is not an entry in the index 50 for this host port-storage controller port, then an entry in the index 50 is added for this first level (N-port) login. Otherwise, control ends.

Figure 4:
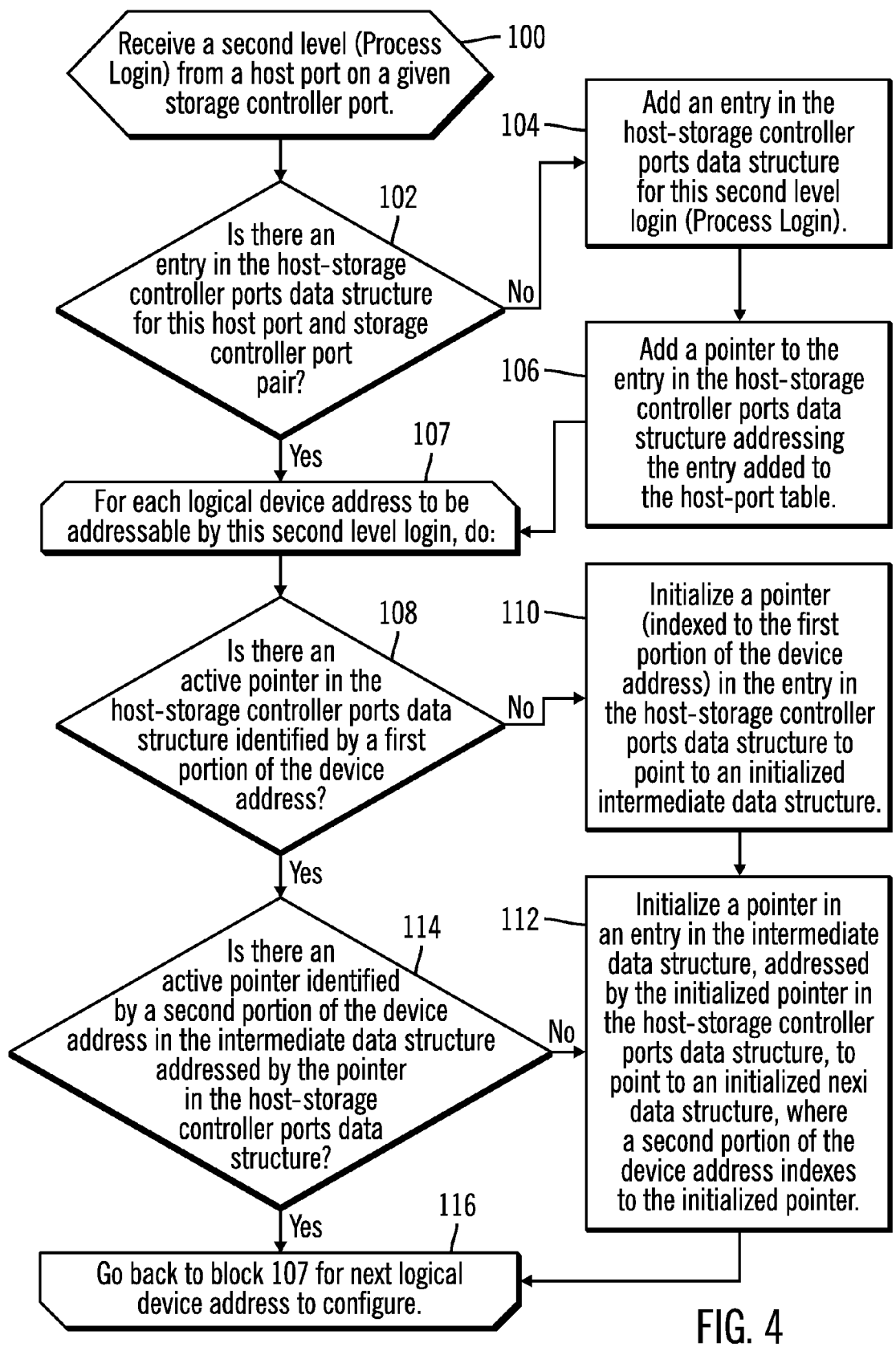

FIG. 4 illustrates operations implemented in the I/O manager 12 to initialize the data structures of FIG. 2 with information in response to a second level login, such as a SCSI process login. Upon receiving (at block 100) a second level login for a host port and storage controller port login, the I/O manager 12 determines (at block 102) whether there is an entry in the host-storage controller ports data structure 52 for this host port and storage controller port pair indicated in the login. If there is no such entry, then an entry is added (at block 104) in the host-storage controller ports data structure 52 for this second level login (Process Login). A pointer 52 is then added (at block 106) to the index 50 addressing the added entry in the host port-storage controller ports data structure 52. If (at block 102) there an entry in the host port-storage controller ports data structure 52 or after adding the pointer, e.g., 52, to the added entry in the host port-storage controller port data structure 56 to the host-port index 50 (at block 106), the I/O manager 12 performs a loop at blocks 107 through 116 for each logical device address accessible to the host port and storage controller port connection. At block 108, the I/O manager 12 determines whether there is an active pointer, e.g., 60a, 60b, in the host port-storage controller port data structure entry 54 identified by a first portion of the device address of the logical volume 14a, 14b . . . 14n. An active pointer comprises a pointer addressing another table or entry and that is not null.

If (at block 108) there is no active pointer, then the I/O manager 12 initializes (at block 110) a pointer, e.g., 60a, 60b, identified (indexed) by the first portion of the device address in the entry in the host port-storage controller port data structure 52, to point to an initialized intermediate data structure, e.g., 62a, 62b, where the intermediate data structure is initialized when initializing the pointer, e.g., 60a, 60b. A pointer, e.g., 64a, 64b, is also initialized (at block 112) in an entry in the intermediate data structure 58a, 58b, addressed by the initialized pointer, e.g., 60a, 60b, in the host port-storage controller port data structure 52, to point to an initialized nexi data structure, e.g., 66a, 66b, where a second portion of the device address indexes to the initialized pointer 60a, 60b in the initialized intermediate data structure. In this way, the pointers and data structures leading to a nexi data structure 66a, 66b for the host port-storage controller ports in the login being established are added if these data structures and pointers were not initialized during the previous establishment of a connection for the same host-pair.

If (at block 114) there is no active pointer, e.g., 64a, 64b, identified by a second portion of the device address in the intermediate data structure 62aa, 62b addressed by the pointer, e.g., 60a, 60b, in the host port-storage controller port data structure 56, then control proceeds to block 112 to initialize the pointer, e.g., 64a, 64b, in the intermediate data structure, e.g., 62a, 62b, to address an initialized nexi data structure, e.g., 66a, 66b. From block 112 or 114, control proceeds to block 116 where another iteration of the loop at blocks 107 through 116 are performed until information is added to the nexus data structures for all determined logical volume addresses accessible to the host port and storage controller port. The I/O manager 12 may add nexus information during device activity. In this way, the pointers and data structures leading to a nexi data structure 62a, 62b for the host port-storage controller port combination associated with the process login being established are added if these data structures and pointers were not initialized during the processing of any previous logical volume address that is accessible by the process login.

Figure 5:
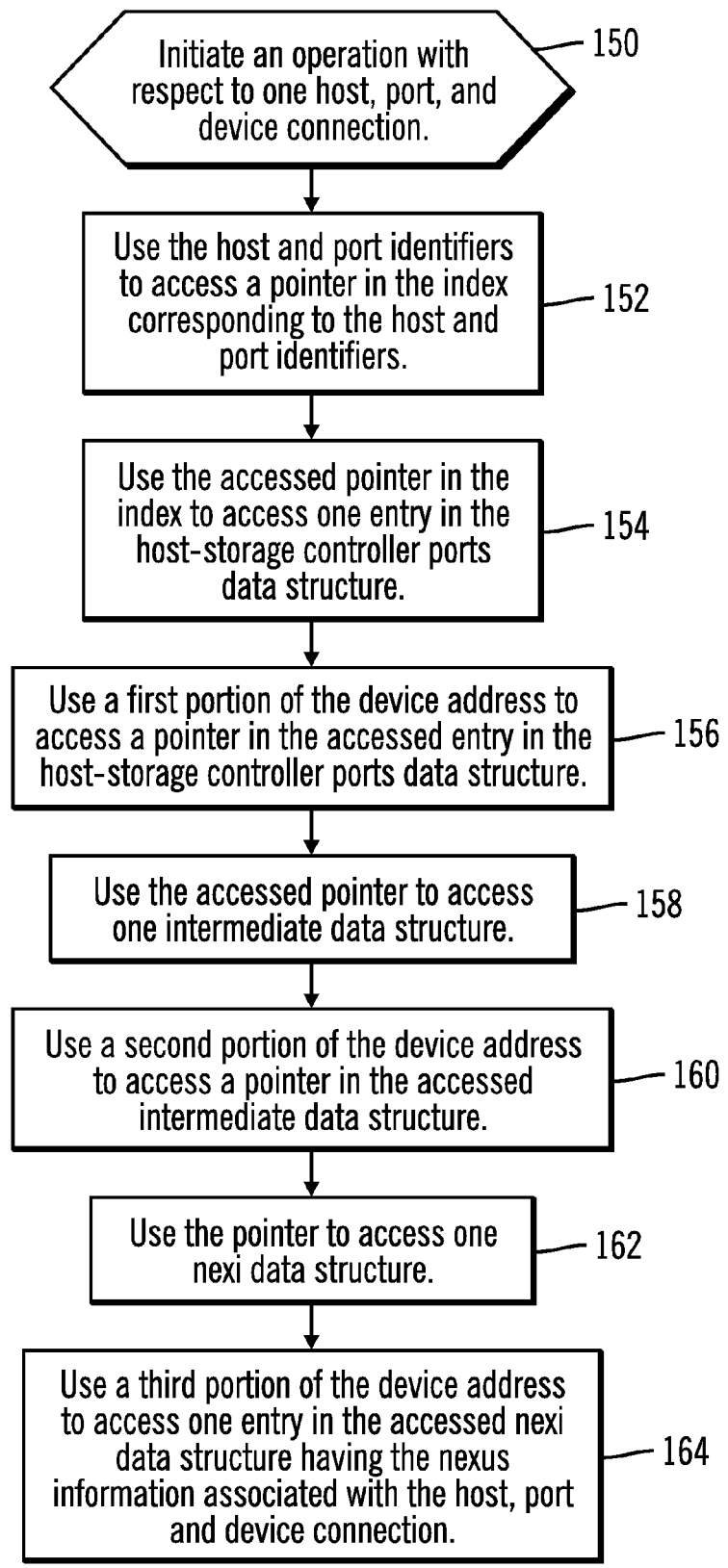

FIG. 5 illustrates an embodiment of operations performed by the I/O manager 12 to initiate an operation with respect to a given host port, storage controller port, and device (logical volume) that requires access to nexus information. Upon initiating (at block 150) the operation, the I/O manager 12 uses (at block 152) the host and port identifiers for the connection to access, i.e., index, to a pointer, e.g., 52, in the host-port index 50. The accessed pointer 52 in the host-port index 50 is used (at block 154) to access one entry, e.g., 54, in the first (host-port) data structure 56. The I/O/manager 12 then uses (at block 156) a first portion of the device address to access a pointer, e.g., 60a, 60b, of the pointers 58, in the accessed entry in the first (host-port) data structure 56. The accessed pointer, e.g., 60a, 60b, is used (at block 158) to access one second (intermediate) data structure 62a, 62b. A second portion of the device address is used (at block 160) to access a pointer, e.g., 64a, 64b, in the accessed second (intermediate) data structure 62a, 62b. The accessed pointer, 64a, 64b is used (at block 162) to access one nexi data structure, e.g., 66a, 66b. The I/O manager 12 then uses a third portion of the device address to access one entry in the accessed nexi data structure, e.g., 66a, 66b, having the nexus information associated with the host port, storage controller port and device combination. This nexus information may be used to maintain status and check conditions for the devices (i.e., logical volumes) accessible to the connection to return to the host indicated in the connection.

Described embodiments provide a technique to maintain nexus information for different host port, storage controller port, and device combinations in an optimal manner that conserves memory space by creating the data structures and entries for the nexus information as needed for the established process login and for those logical volumes accessible by a given process login. Further, where the assumption that a significant percentage of the process logins are not configured to have access to a high percentage of the configurable logical volume addresses is valid, it is possible to greatly reduce the amount of memory allocated for nexus information without loosing the ability for a arbitrary subset of the connections (i.e., process logins) to be configured for access to most or all logical volume addresses.

ADDITIONAL EMBODIMENT DETAILS

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The reference letter "n" is used to refer to an instance number of an element, e.g., hosts 2a, 2b . . . 2n, volumes 14a, 14b . . . 14n, and may indicate a different or same number of elements in different usages. For instance the number of hosts 2n may differ from the number of volumes 14n.

FIG. 2 shows an arrangement of data structures used to maintain nexus information. In alternative embodiments, additional intermediate structures may be used to expand the number of possible host port, storage controller port, and device connection combinations.

Certain embodiments may be directed to a method for deploying computing instruction by a person or automated processing integrating computer-readable code into a computing system, wherein the code in combination with the computing system is enabled to perform the operations of the described embodiments.

The illustrated operations of FIGS. 3, 4, and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing hosts access to devices via storage controller ports, comprising:
   receiving a login from a host port on a storage controller port, wherein the host port has been configured on the storage controller to access one or more devices, wherein the login is configured to access at least one of the devices;
   adding an entry to a host-storage controller ports data structure for the host port and storage controller port involved in the login;
   initializing at least one pointer in the entry in the host-storage controller ports data structure to point to at least one entry in at least one intermediate data structure; and
   initializing one pointer in at least one entry in the intermediate data structure addressed by the initialized pointer in the host-storage controller ports data structure to point to a nexi data structure having a plurality of entries, wherein at least one entry in the nexi data structure identifies a device accessed through the host and storage controller ports identified in the added entry in the host-storage controller ports data structure, wherein the operations of initializing the at least one pointer in the entry in the host storage controller ports data structure and initializing the pointer in the intermediate data structure to point to a nexi data structure are performed when needed to provide information on the at least one device the login is configured to access.

2. The method of claim 1, wherein the login comprises a second level login, further comprising:
   receiving a first level login for one host port and storage controller port;
   adding an entry to an index for the host port and storage controller port indicated in the first level login;
   adding a pointer to the added entry in the index for the host port and storage controller port to address the entry added to the host-storage controller ports data structure during the second level login.

3. The method of claim 2, wherein the first level login comprises a Fibre Channel N-port login and wherein the second level login comprises a SCSI process login.

4. The method of claim 2, further comprising:
   initiating an operation with respect to one host port, storage controller port, and device connection;
   using host port and storage controller port identifiers to access the pointer in the index corresponding to the host port and storage controller identifiers;
   using the accessed pointer in the index to access one entry in the host-storage controller ports data structure to access the nexus information for the host port, storage controller port, and device connection to use in performing the operation.

5. The method of claim 1, wherein the entry in the nexi data structure to which the nexus information is added corresponds to a portion of a device address of the device involved in the login.

6. The method of claim 1, further comprising:
   processing an operation with respect to a host port, storage controller port, and device, wherein the device has a device address
   using a first portion of the device address to access a first pointer in one entry in the host-storage controller ports data structure;
   using the accessed first pointer to access the intermediate data structure;
   using a second portion of the device address to access a second pointer in the accessed entry in the intermediate data structure;
   using the second pointer to access one nexi data structure; and
   using a third portion of the device address to access one entry in the accessed nexi data structure having the nexus information associated with the host port, storage controller port and device connection.

7. The method of claim 1, wherein the entries in the nexi data structure provide nexus information for devices having consecutive device addresses.

8. The method of claim 1, wherein the intermediate data structure includes a plurality of pointers, each pointing to a different nexi data structure having nexus information for different devices to which the host port and storage controller port associated with the entry in the host-storage controller ports data structure connect.

9. The method of claim 8, wherein less than all the entries in the nexi data structures associated with the host and storage controller ports include nexus information.

10. The method of claim 8, wherein one entry in the host-storage controller ports data structure includes a plurality of pointers each pointing to a different intermediate data structure, wherein each intermediate data structure includes at least one pointer addressing one nexi data structure providing entries having nexus information for the host port, storage controller port, and device connection.

11. The method of claim 1, wherein the device comprises a logical storage unit managed by the storage controller.

12. The method of claim 1, further comprising:
    determining whether there is one pointer, identified by a first portion of a device address for one device accessible through the login, in one entry in the host-storage controller ports data structure addressing one entry in the intermediate data structure, wherein the pointer is initialized in the host-storage controller ports data structure in response to determining there is no pointer identified by the first portion of the device address addressing one entry in the intermediate data structure.

13. The method of claim 1, further comprising:
    determining whether there is one pointer, identified by a second portion of a device address for one device accessible through the login, in the intermediate data structure addressed by the pointer in the host-storage controller ports data structure, wherein the pointer is initialized in the intermediate data structure in response to determining that there is no pointer identified by the second portion of the device address addressing one nexi data structure.

14. A method for deploying computing instructions, comprising integrating computer-readable code into a system, wherein the code in combination with the system is enabled to cause the system to perform:
    receiving a login from a host port on a storage controller port, wherein the host port has been configured on the storage controller to access one or more devices, wherein the login is configured to access at least one of the devices;
    adding an entry to a host-storage controller ports data structure for the host port and storage controller port involved in the login;
    initializing at least one pointer in the entry in the host-storage controller ports data structure to point to at least one entry in at least one intermediate data structure; and
    initializing one pointer in at least one entry in the intermediate data structure addressed by one initialized pointer in the host-storage controller ports data structure to point to a nexi data structure having a plurality of entries, wherein at least one entry in the nexi data structure identifies a device accessed through the host and storage controller ports identified in the added entry in the host-storage controller ports data structure, wherein the operations of initializing the at least one pointer in the entry in the host storage controller ports data structure and initializing the pointer in the intermediate data structure to point to a nexi data structure are performed when needed to provide information on the at least one device the login is configured to access.

15. The method of claim 14, wherein the login comprises a second level login, further comprising:
receiving a first level login for one host port and storage controller port;
adding an entry to an index for the host port and storage controller port indicated in the first level login;
adding a pointer to the added entry in the index for the host port and storage controller port to address the entry added to the host-storage controller ports data structure during the second level login.

16. A system in communication with hosts having host port and devices, comprising:
a plurality of storage controller ports;
a processor;
a memory including a host-storage controller port data structure, at least one intermediate data structure, and at least one nexi data structure;
a computer readable storage medium including code executed by the processor to perform operations, the operations comprising:
receiving a login from a host port on a storage controller port, wherein the host port has been configured on the storage controller to access one or more devices, wherein the login is configured to access at least one of the devices;
adding an entry to a host-storage controller ports data structure for the host port and storage controller port involved in the login;
initializing at least one pointer in the entry in the host-storage controller ports data structure to point to at least one entry in at least one intermediate data structure; and
initializing one pointer in at least one entry in the intermediate data structure addressed by one initialized pointer in the host-storage controller ports data structure to point to a nexi data structure having a plurality of entries, wherein at least one entry in the nexi data structure identifies a device accessed through the host and storage controller ports identified in the added entry in the host storage controller ports data structure, wherein the operations of initializing the at least one pointer in the entry in the host storage controller ports data structure and initializing the pointer in the intermediate data structure to point to a nexi data structure are performed when needed to provide information on the at least one device the login is configured to access.

17. The system of claim 16, wherein the login comprises a second level login, wherein the operations further comprise:
receiving a first level login for one host port and storage controller port;
adding an entry to an index for the host port and storage controller port indicated in the first level login;
adding a pointer to the added entry in the index for the host port and storage controller port to address the entry added to the host-storage controller ports data structure during the second level login.

18. The system of claim 17, wherein the first level login comprises a Fibre Channel N-port login and wherein the second level login comprises a SCSI process login.

19. The system of claim 17, wherein the operations further comprise:
initiating an operation with respect to one host port, storage controller port, and device connection;
using host port and storage controller port identifiers to access the pointer in the index corresponding to the host port and storage controller identifiers;
using the accessed pointer in the index to access one entry in the host-storage controller ports data structure to access the nexus information for the host port, storage controller port, and device connection to use in performing the operation.

20. The system of claim 16, wherein the entry in the nexi data structure to which the nexus information is added corresponds to a portion of a device address of the device involved in the login.

21. The system of claim 16, wherein the operations further comprise: processing an operation with respect to a host port, storage controller port, and device, wherein the device has a device address;
using a first portion of the device address to access a first pointer in one entry in the host-storage controller ports data structure;
using the accessed first pointer to access the intermediate data structure;
using a second portion of the device address to access a second pointer in the accessed entry in the intermediate data structure;
using the second pointer to access one nexi data structure; and
using a third portion of the device address to access one entry in the accessed nexi data structure having the nexus information associated with the host port, storage controller port and device connection.

22. The system of claim 16, wherein the entries in the nexi data structure provide nexus information for devices having consecutive device addresses.

23. The system of claim 16, wherein the intermediate data structure includes a plurality of pointers, each pointing to a different nexi data structure having nexus information for different devices to which the host port and storage controller port associated with the entry in the host-storage controller ports data structure connect.

24. The system of claim 23, wherein less than all the entries in the nexi data structures associated with the host and storage controller ports include nexus information.

25. The system of claim 23, wherein one entry in the host-storage controller ports data structure includes a plurality of pointers each pointing to a different intermediate data structure, wherein each intermediate data structure includes at least one pointer addressing one nexi data structure providing entries having nexus information for the host port, storage controller port, and device connection.

26. The system of claim 16, wherein the device comprises a logical storage unit managed by the storage controller.

27. The system of claim 16, wherein the operations further comprise:
determining whether there is one pointer, identified by a first portion of a device address for one device accessible through the login, in one entry in the host-storage controller ports data structure addressing one entry in the intermediate data structure, wherein the pointer is initialized in the host-storage controller ports data structure in response to determining there is no pointer identified by the first portion of the device address addressing one entry in the intermediate data structure.

28. The system of claim 16, wherein the operations further comprise:
determining whether there is one pointer, identified by a second portion of a device address for one device accessible through the login, in the intermediate data structure addressed by the pointer in the host-storage controller ports data structure, wherein the pointer is initialized in the intermediate data structure in response to determining that there is no pointer identified by the second portion of the device address addressing one nexi data structure.

29. An article of manufacture comprising a computer readable storage medium including code executed by a processor to communicate with hosts having host ports, devices, and a memory including data structures, wherein the code is executed to perform operations, the operations comprising:
receiving a login from a host port on a storage controller port, wherein the host port has been configured on the storage controller to access one or more devices, wherein the login is configured to access at least one of the devices;
adding an entry to a host-storage controller ports data structure for the host port and storage controller port involved in the login;
initializing at least one pointer in the entry in the host-storage controller ports data structure to point to at least one entry in at least one intermediate data structure; and
initializing one pointer in at least one entry in the intermediate data structure addressed by one initialized pointer in the host-storage controller ports data structure to point to a nexi data structure having a plurality of entries, wherein at least one entry in the nexi data structure identifies a device accessed through the host and storage controller ports identified in the added entry in the host-storage controller ports data structure, wherein the operations of initializing the at least one pointer in the entry in the host storage controller ports data structure and initializing the pointer in the intermediate data structure to point to a nexi data structure are performed when needed to provide information on the at least one device the login is configured to access.

30. The article of manufacture of claim 29, wherein the login comprises a second level login, wherein the operations further comprise:
receiving a first level login for one host port and storage controller port;
adding an entry to an index for the host port and storage controller port indicated in the first level login;
adding a pointer to the added entry in the index for the host port and storage controller port to address the entry added to the host-storage controller ports data structure during the second level login.

31. The article of manufacture of claim 30, wherein the first level login comprises a Fibre Channel N-port login and wherein the second level login comprises a SCSI process login.

32. The article of manufacture of claim 30, wherein the operations further comprise:
initiating an operation with respect to one host port, storage controller port, and device connection;
using host port and storage controller port identifiers to access the pointer in the index corresponding to the host port and storage controller identifiers;
using the accessed pointer in the index to access one entry in the host-storage controller ports data structure to access the nexus information for the host port, storage controller port, and device connection to use in performing the operation.

33. The article of manufacture of claim 29, wherein the entry in the nexi data structure to which the nexus information is added corresponds to a portion of a device address of the device involved in the login.

34. The article of manufacture of claim 29, wherein the operations further comprise:
processing an operation with respect to a host port, storage controller port, and device, wherein the device has a device address
using a first portion of the device address to access a first pointer in one entry in the host-storage controller ports data structure;
using the accessed first pointer to access the intermediate data structure;
using a second portion of the device address to access a second pointer in the accessed entry in the intermediate data structure;
using the second pointer to access one nexi data structure; and
using a third portion of the device address to access one entry in the accessed nexi data structure having the nexus information associated with the host port, storage controller port and device connection.

35. The article of manufacture of claim 29, wherein the entries in the nexi data structure provide nexus information for devices having consecutive device addresses.

36. The article of manufacture of claim 29, wherein the intermediate data structure includes a plurality of pointers, each pointing to a different nexi data structure having nexus information for different devices to which the host port and storage controller port associated with the entry in the host-storage controller ports data structure connect.

37. The article of manufacture of claim 36, wherein less than all the entries in the nexi data structures associated with the host and storage controller ports include nexus information.

38. The article of manufacture of claim 36, wherein one entry in the host-storage controller ports data structure includes a plurality of pointers each pointing to a different intermediate data structure, wherein each intermediate data structure includes at least one pointer addressing one nexi data structure providing entries having nexus information for the host port, storage controller port, and device connection.

39. The article of manufacture of claim 29, wherein the device comprises a logical storage unit managed by the storage controller.

40. The article of manufacture of claim 29, wherein the operations further comprise:
determining whether there is one pointer, identified by a first portion of a device address for one device accessible through the login, in one entry in the host-storage controller ports data structure addressing one entry in the intermediate data structure, wherein the pointer is initialized in the host-storage controller ports data structure in response to determining there is no pointer identified by the first portion of the device address addressing one entry in the intermediate data structure.

41. The article of manufacture of claim 29, wherein the operations further comprise:
determining whether there is one pointer, identified by a second portion of a device address for one device accessible through the login, in the intermediate data structure addressed by the pointer in the host-storage controller ports data structure, wherein the pointer is initialized in the intermediate data structure in response to determining that there is no pointer identified by the second portion of the device address addressing one nexi data structure.

* * * * *